J. R. BURROWS.
ARTIFICIAL FLOWER.
APPLICATION FILED JAN. 28, 1919.
1,307,617.
Patented June 24, 1919.
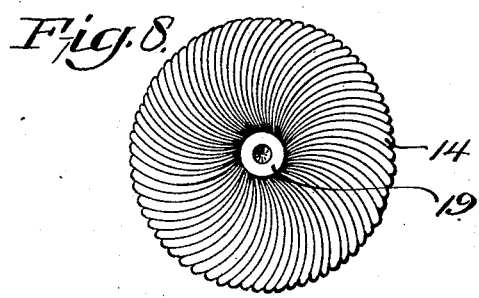
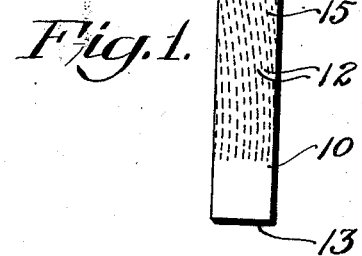
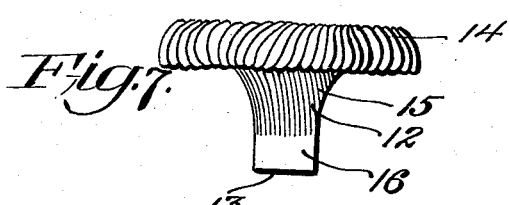
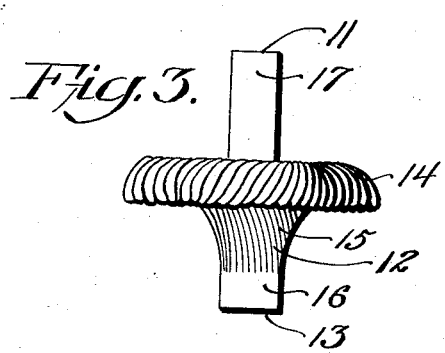
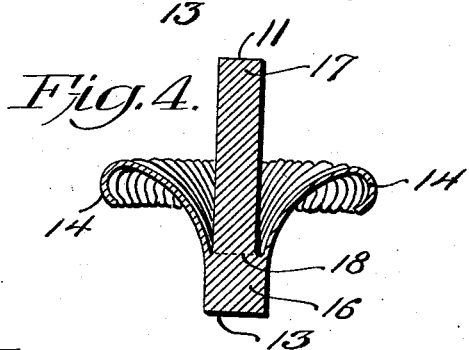
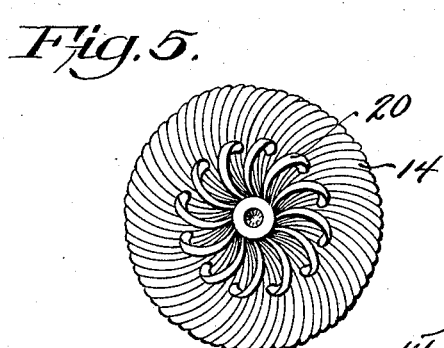
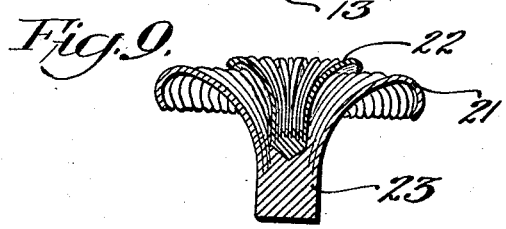
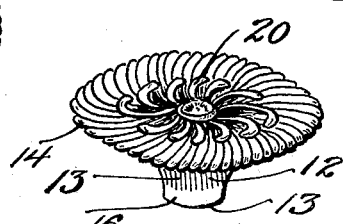
WITNESSES:
Mary A. Inglar
Augustus B. Coppes
INVENTOR
John R. Burrows,
BY
Joshua R. H. Toth
his ATTORNEY.

UNITED STATES PATENT OFFICE.

JOHN R. BURROWS, OF WILMINGTON, DELAWARE.

ARTIFICIAL FLOWER.

1,307,617.　　　　　Specification of Letters Patent.　　Patented June 24, 1919.

Application filed January 28, 1919. Serial No. 273,620.

*To all whom it may concern:*

Be it known that I, JOHN R. BURROWS, a citizen of the United States, residing at Wilmington, in the county of New Castle and State of Delaware, have invented certain new and useful Improvements in Artificial Flowers, of which the following is a specification.

One object of my invention is to produce artificial flowers from wood in such manner that the flowers will be ornamental in appearance and durable.

Another object is to so cut the wood that flowers can be quickly produced with one or more rows or layers of petals.

These objects, and other advantageous ends which will be described hereinafter, I attain in the following manner, reference being had to the accompanying drawings in which—

Figures 1 and 2 are an elevation and top plan view, respectively, of a piece of wood such as I use in making one of my improved artificial flowers, Fig. 3 is an elevation showing one stage in the method of making one of my improved artificial flowers, Fig. 4 is a central sectional elevation of Fig. 3, Fig. 5 is a top plan view showing the next step in the operation when making a double flower from the form shown in Figs. 3 and 4, Fig. 6 is a perspective view of the double flower shown in Fig. 5, Fig. 7 is a front elevation of a single flower which is made directly from the form shown in Figs. 3 and 4, in which the central projection is severed instead of cutting it to produce the double flower of Figs. 5 and 6, Fig. 8 is a top plan view of Fig. 7, and Fig. 9 is a central sectional elevation showing a modified form of my invention and another way to produce a double flower by inserting one small flower within another.

In carrying out my invention, I preferably use cylindrical pieces of tough wood of a light color such, for example, as shown at 10. Starting at the top 11 I cut, downwardly, a series of strips 12. These strips are not entirely severed from the body portion of the wood, but on the contrary, the cutting of the strips stops short of the bottom 13. The depth of cut into the wood may vary but I preferably make the cuts thin and due to the action of the knife in cutting said strips they will take a curled form so as to produce the petals 14, as clearly shown in the drawing. The cutting is done consecutively and preferably at a slight incline or curve in the direction of the circumference of the cylindrical piece of wood, such as shown by the dotted lines 15 in Fig. 1. After cutting the wood in this manner the result will be as shown in Fig. 3, in which the bottom part 16 will form the stem and will be solid. The petals 14 will be integral with the stem 16 and a projection or core 17 of uncut wood will be positioned centrally and extend upwardly from the stem 16, as clearly shown in Fig. 4. If it is desired to produce only a single flower, or in other words, a flower having a single row or layer of petals, the projection 17 can be cut off, for example, at the line 18 and in this instance a single flower will be produced, as shown in Figs. 7 and 8. If desired, a central cavity 19 can be made in the top of the stem 16 to give a finished effect to the flower, as shown in Fig. 8.

On the other hand, if it is desired to produce a flower having a double row or layer of petals, such for example, as shown in Figs. 5 and 6, instead of cutting the projection 17 off along the line 18, the projection 17 can be again cut by producing strips, such as strips 12, making said cuts of a shorter length. This cutting of the projection 17 will produce the central row or layer of petals shown at 20 in Figs. 5 and 6. In this manner a plurality of rows or layers of petals can be successively cut and by making the cuts of various lengths, the rows or layers of petals will be of various diameters.

It will be further noted that the various strips in the several layers can be cut at different distances apart. For example, in the form shown in Figs. 5 and 6, the petals 20 are of less number and farther apart than are the petals 14. By varying the cuts in this manner, a great variety of forms can be produced and extremely pleasing ornamental effects will result.

In Fig. 9, I have shown a manner of producing a double flower by combining two single flowers 21 and 22, both of which can be made substantially in the manner described in making the single form illustrated in Figs. 7 and 8, it merely being necessary to glue or otherwise secure the single flower 22 to the top of the stem 23 within the flower 21.

By using a white or light colored wood, the flowers can be dyed various colors and shades of colors.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The process of making artificial flowers as herein described, consisting of making a series of cuts in the peripheral surface of a piece of wood or like material to provide a plurality of thin strips, one end of said strips being permitted to remain integral with the piece from which they are cut; and then cutting off the remaining solid core.

2. The process of making artificial flowers as herein described which consists in cutting a series of strips successively around a peripheral surface of a piece of wood or like material to provide a plurality of petals, one end of each strip being permitted to remain integral with the piece from which the remaining portions are cut; and then cutting off the remaining solid core.

3. The process of making artificial flowers as herein described, consisting of making a series of cuts in a peripheral surface of a piece of wood or like material, said cuts being made successively and extending at an angle in a direction circumscribing said peripheral surface, one end of each of said strips being permitted to remain integral with the piece from which the other portions are cut.

4. An artificial flower including a single piece of material having cut petals; and a solid stem in which one end of the petals are integral with said stem; said petals, from their points of connection with the stem, flaring outwardly and being arranged in angular position with respect to the stem, substantially as described.

5. An artificial flower including a stem having a plurality of rows or layers of cut petals formed integral with said stem; said petals, from their points of connection with the stem, flaring outwardly and being arranged in angular position with respect to the stem, substantially as described.

In testimony whereof I have signed my name to this specification in the presence of two subscribing witnesses.

JOHN R. BURROWS.

Witnesses:
GEORGE L. DICKENSON,
J. CHANDLER HENDRICKSON.